(12) United States Patent
Sparrow

(10) Patent No.: US 9,221,510 B2
(45) Date of Patent: Dec. 29, 2015

(54) LAMP

(71) Applicant: Roger Lionel David Sparrow, Petworth (GB)

(72) Inventor: Roger Lionel David Sparrow, Petworth (GB)

( * ) Notice: Subject to any disclaimer, the term of this patent is extended or adjusted under 35 U.S.C. 154(b) by 362 days.

(21) Appl. No.: 13/732,742

(22) Filed: Jan. 2, 2013

(65) Prior Publication Data

US 2013/0176747 A1 Jul. 11, 2013

(30) Foreign Application Priority Data

Jan. 11, 2012 (GB) .................................. 1200456.0

(51) Int. Cl.

| | |
|---|---|
| *B62J 6/00* | (2006.01) |
| *B62J 6/16* | (2006.01) |
| *H05B 33/08* | (2006.01) |
| *B62J 6/02* | (2006.01) |
| *F21L 4/02* | (2006.01) |
| *F21V 1/00* | (2006.01) |
| *F21V 23/00* | (2015.01) |
| *F21W 101/023* | (2006.01) |
| *F21Y 101/02* | (2006.01) |

(52) U.S. Cl.
CPC .... *B62J 6/16* (2013.01); *B62J 6/02* (2013.01); *F21L 4/027* (2013.01); *F21L 15/02* (2013.01); *F21V 23/003* (2013.01); *H05B 33/0854* (2013.01); *F21W 2101/023* (2013.01); *F21Y 2101/02* (2013.01)

(58) Field of Classification Search
CPC .............. B62J 6/00; B62J 6/001; B62J 6/003; B62J 2006/006
USPC .................................. 362/473, 474, 475, 476
See application file for complete search history.

(56) References Cited

U.S. PATENT DOCUMENTS

| | | | |
|---|---|---|---|
| 2009/0195350 A1* | 8/2009 | Tsern et al. ..................... 340/3.1 |
| 2010/0052551 A1* | 3/2010 | Sparrow ........................ 315/178 |
| 2010/0219775 A1* | 9/2010 | Maglica et al. ............... 315/362 |

\* cited by examiner

*Primary Examiner* — Andrew Coughlin

(74) *Attorney, Agent, or Firm* — Jennifer Meredith, Esq.; Meredith & Keyhani, PLLC

(57) ABSTRACT

A lamp has a body 100 with a printed circuit board 102 and a battery 104 mounted in the body. An LED 105, mounted on an emitter plate 101, and a reflector 106 are housed on the body at an opposite end to a charging port 103. Adjacent to the port 103 an array of three illumination status blue LEDS 108 and an array of five battery-status red LEDs 109 are provided. Components 103 to 109 are connected to a power management circuit 110, including an Integrated Circuit 111, mounted on the PCB 102. The PCB 102 further includes a capacitive Micro-Electro-Mechanical Systems (MEMS) accelerometer 123.

13 Claims, 4 Drawing Sheets

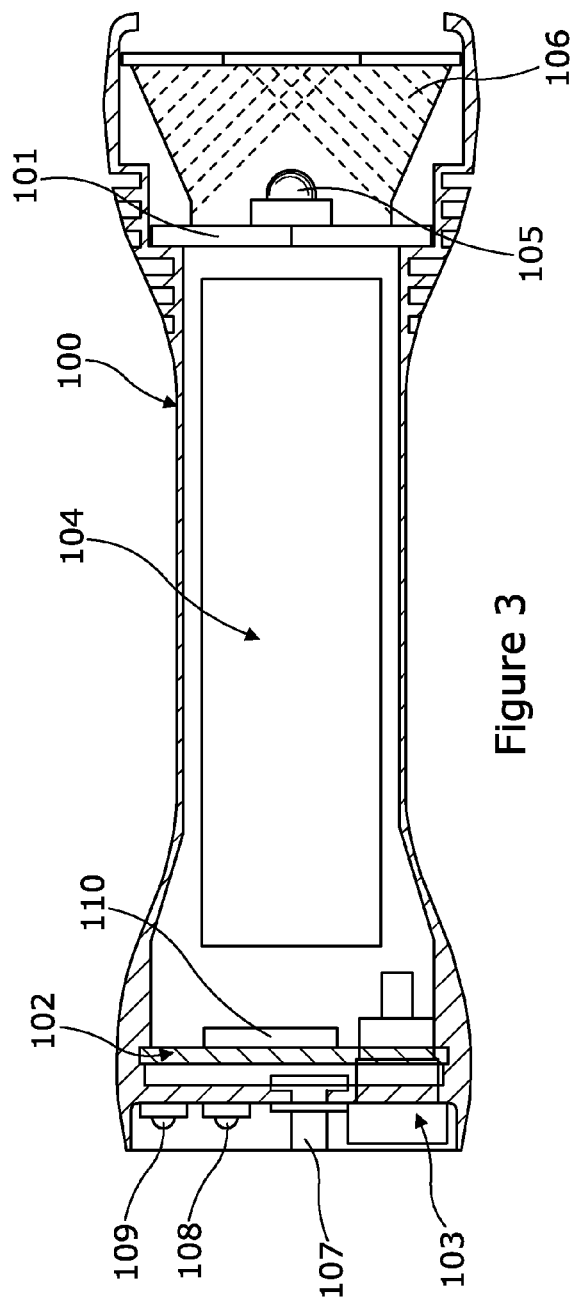
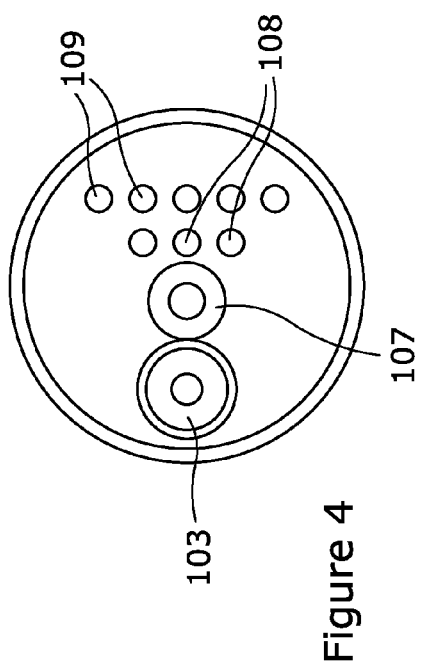
Figure 3
Figure 4

LAMP

This application claims priority to British Application Number 1200456.0 filed on Jan. 11, 2012 in the United Kingdom, which is incorporated herein by reference.

The present invention relates to a lamp and in particular a battery-powered, LED (light emitting diode) lamp.

A toy wand is known from US Patent Application US 2002/0058459. In the words of the abstract: "The wand is activated and controlled by a sequence of motions of the wand while in the hand of an operator. When moved through a specific sequence of motions (herein termed a "spell"), the wand will produce an appealing display of lights whose purpose is to amuse or entertain the wand operator or others in the viewing area. The toy wand comprises a casing, a means for detecting a sequence of motions, one or more lights, and a means for providing time-varying illumination from the lights as a function of the history of motions of the wand."

The means for detecting a sequence of motions is an accelerometer and the lights are LEDs alternatively illuminated in accordance with the movement detected by the accelerometer.

A portable lighting device is known from US Patent Application US 2010/0219775. In the words of the abstract: "A portable lighting device having a plurality of modes of operation and method of operating the portable lighting device are disclosed. One method of operating the portable lighting device is by rotating the portable lighting device along a principal axis of projection of the light source to enter into a new mode of operation. Normal, dim, motion sensitive, variable brightness, blink, right and left hand, lock out, SOS, night light, strobe, compass and signal modes are disclosed, and the modes may be adjusted. A rechargeable battery pack is disclosed that includes a housing, a rechargeable battery, and an accelerometer. A battery cassette is disclosed that provides a negative electrode at each end of the battery cassette, and a central connector that provides a positive electrode at both ends of the battery cassette."

The lamp as marketed has a button that must be depressed in with indicia for the required mode upper most. The mode is then initiated. After initiation, selections within the mode, for instance flash on and off can be selected by turning about the barrel with out the button depressed.

In our UK patent application No 2,462,935 9 (Our Earlier Application), an LED lamp is described whose output can be stepped between different levels of output. Most of our lamps are sold for use on pedal bicycles including mountain bikes. Riders of the latter are very conscious of the length of power left in the batteries of their lamps, to such extent that when conditions are good and/or when they are going slowly, they turn their lamps down despite this requiring awkward pressing on the button on the end of the lamp mounted on the handlebars.

The object of the present invention is to provide an improved LED lamp for use on a bicycle.

For completeness it should be noted that the invention of Our Earlier Application related to the ability to draw power from a lamp's battery for external use. As such it's invention was claimed as:

A lamp adapted to power itself and an external device from its own internal battery, the lamp comprising:
a housing;
a light emitting device mounted on the housing;
a battery mounted within the housing;
a port for charging the battery mounted on the housing;
a switch for switching on/off the light emitting device;
means for supplying electric current from the battery for external use.

According to the present invention there is provided a bicycle lamp comprising:
a housing;
an LED or array thereof mounted on the housing;
a battery mounted within the housing;
a switch for switching on/off the light emitting device;
means for determining the rate of climb of the bicycle;
illumination control means for incrementally reducing current to the LED or array in the event of the sensor detecting that the bicycle is being ridden uphill.

Preferably the means for determining the rate of climb of the bicycle comprises an accelerometer. Typically the accelerometer is a capacitive Micro-Electro-Mechanical Systems (MEMS) accelerometer, adapted to detect movement of the sensor by virtue of the displacement of a seismic mass between two charged plates causing a change in the capacitance between the two plates. The accelerometer may be adapted to detect movement of the lamp and the housing in terms of acceleration of the mass and orientation in terms of the gravitational attraction on the mass.

Alternatively, the means for determining the rate of climb of the bicycle may comprise a GPS receiver programmed to determine the rate of climb and/or a microprocessor programmed to determine the rate of climb from a signal from a GPS receiver. Preferably the GPS receiver is mounted on the housing of the lamp. Alternatively the GPS receiver may be connected to the lamp by wire or wirelessly. The GPS receiver may be adapted to calculate its position by timing signals from satellites in orbit of the Earth. The GPS receiver may be adapted to calculate its current elevation or, using mapping software, the current gradient at its location.

Reduction in uphill illumination is not a disadvantage, because the rider will be going slower than normal and be less in need of light. Also since slower uphill takes longer, battery life is conserved.

Further the illumination control means can be adapted to incrementally increase the LED current in event of the sensor detecting that the bicycle is being ridden downhill.

Preferably a sensor for sensing the temperature of the housing is also provided. The temperature of the housing will decrease as the speed of the rider increases and conversely the temperature of the housing will increase as the speed of the rider decreases. Thus the illumination control means can be adapted to incrementally increase the LED current in event of the sensor detecting a decrease in temperature and/or decrease the LED current in the event of the sensor detecting an increase in the temperature.

In the preferred embodiment, a status display LED or array therof is provided. The status display array can include a first array of LEDs to indicate battery status and a second array of LEDs to indicate illumination brightness.

To help understanding of the invention, a specific embodiment thereof will now be described by way of example and with reference to the accompanying drawings, in which:

FIG. 3 is a diagrammatic cross-sectional view of a lamp in accordance with the invention;

FIG. 4 is an end view of the lamp of FIG. 3, showing battery-status and illumination power LEDs;

Figure 1:
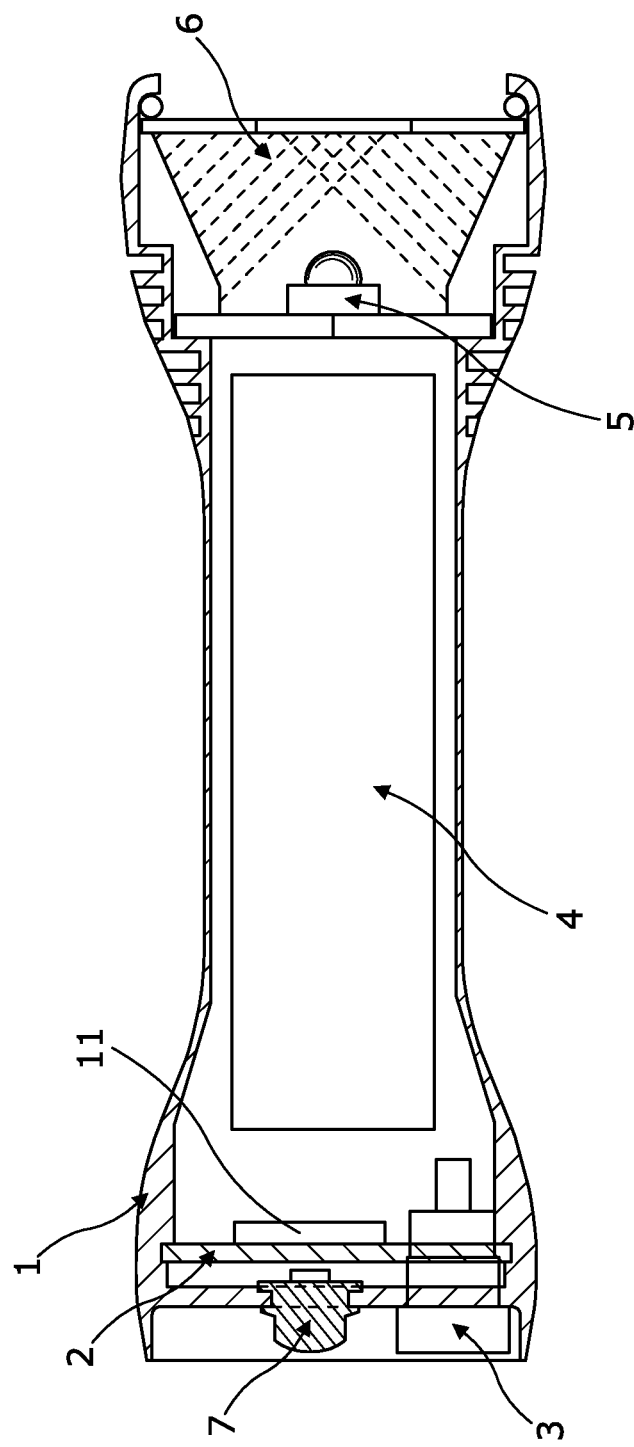
FIG. 1 is a diagrammatic cross-sectional view of a lamp of Our Earlier Application.
Figure 2:
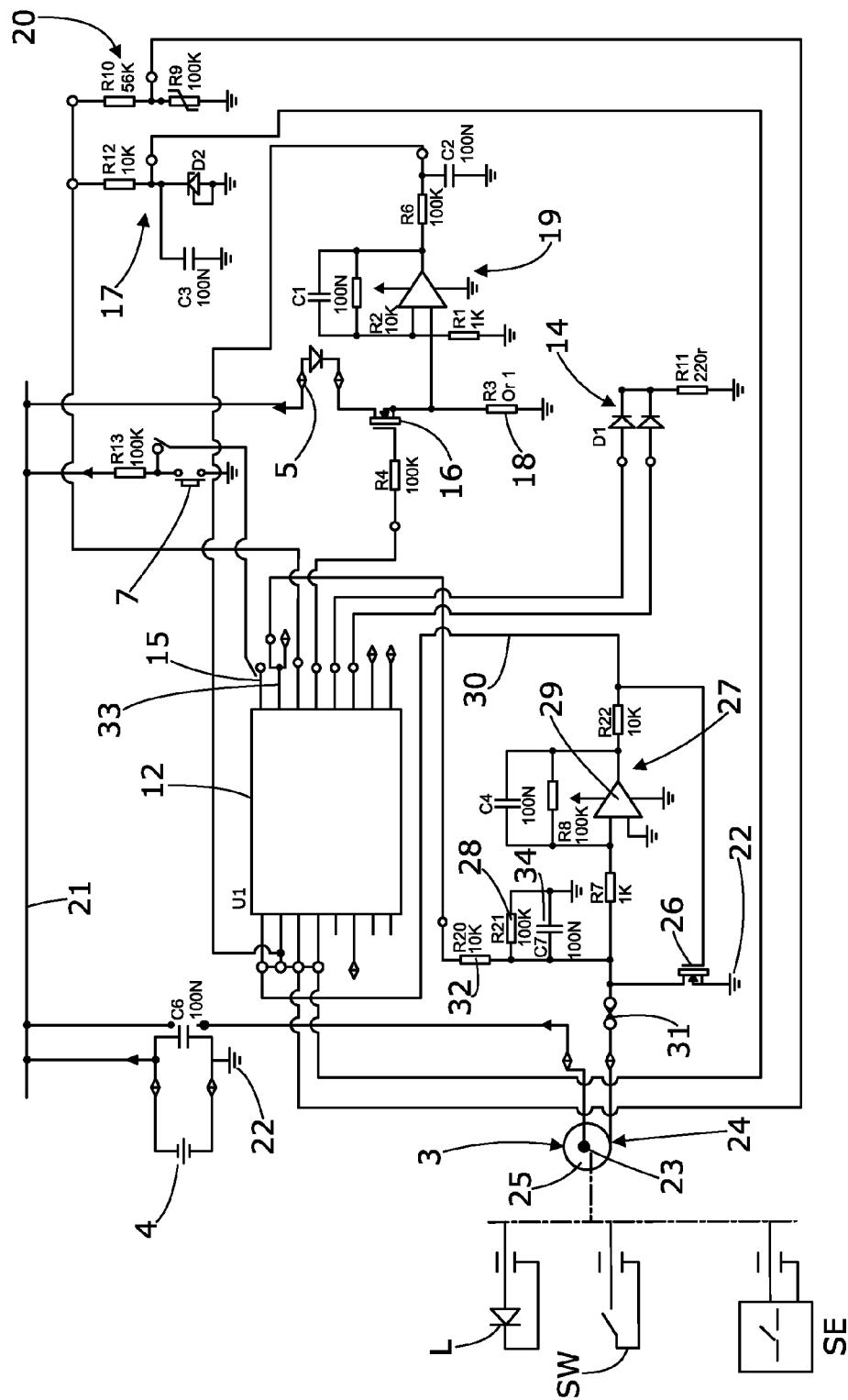
FIG. 2 is a circuit diagram of the lamp of FIG. 1.

Referring to the drawings, of which FIGS. 1 and 2 are re-numbered ones from Our Earlier Application. Most of the physical features of the lamp of the preferred embodiment of that application are used in the preferred embodiment of the lamp of the present invention. For completeness, the description with reference to the drawings of Our Earlier Application is repeated below in italics—omitting certain detail irrelevant for present purposes.

*A lamp has a body 1, in which is mounted a printed circuit board (PCB) 2, to which is connected amongst other components a charging port 3. A battery 4 is housed in the body, which also carries a light emitting diode 5 and a reflector 6 at the end opposite from the port 3. Adjacent the port is a press button switch 7. FIG. 1 is diagrammatic, insofar for instance as wiring is not shown.*

*A power management circuit 11, mounted in physical form on the PCB 2, has a programmed microprocessor/integrated circuit (IC) 12 of the PIC18F1320-1/SS type. It is programmed in accordance with the description below, but could be programmed with differences in detail.*

*The port 3, the battery 4, the LED 5 and the switch 7 are connected to the circuit. The switch incorporates a bi-colour LED 14 powered by the IC 12 to indicate battery state and the state of powering of the lamp. The switch itself is connected to ground an input terminal 15 of the IC for controlling it.*

*The LED is switched on by applying a voltage to the base of a switching field effect transistor 16 in series with its earth connection. Brightness of the LED is controlled by pulse width modulation, that is controlling proportion of the time that it is switched on, that is the proportion of the time that current is actually flowing through it. To maintain the brightness constant, the IC is provided with a battery voltage measuring circuit 17 and is programmed to adjust the pulse width of current supply for desired brightness. The actual current is measured in terms of voltage across a resistor 18 in series with the transistor 16, the voltage being measured by an amplifier circuit 19 and fed back to the IC 12 for control of the pulse width. A temperature measuring circuit 20 is provided to reduce the current in the event of LED resistance drop to avoid thermal run away. The IC 12 can be programmed to reduce the brightness in event that the temperature rises unacceptably.*

*The battery is connected between a positive voltage line 21 and local earth 22 in the lamp. The central contact 23 of the port 24 is connected to the voltage line 21, i.e. to the positive battery terminal, but the outer contact 25 is not connected directly to earth. This is to protect the battery from accidental short-circuiting. In order to allow the battery to be charged, a field effect transistor switch 26 is provided, associated with a detection circuit 27. Normally the outer contact will be grounded via a high resistance (100 k) 28. When a charger voltage C, as opposed to a short circuit, is applied to the port 3, the input to the operational amplifier 29 in the detection circuit will have the polarity of its inputs reversed. It will change state, causing a positive voltage on its output and activate the switch 26 to provide a return path for the charging current via the local earth. The positive voltage is passed to the IC on line 30, causing the switch LED 14 to flash green, indicating charging. The lamp can still be used in this state, as when it is being used in conjunction with a back-up battery pack (not shown).*

*If an auxiliary load L is applied to the port, a route to ground is provided via the resistance 28. Thus a low voltage is applied across the load, assuming the load to be of lower resistance than the resistance 28.*

*The IC 12 can be controlled by operation of the switch to apply a voltage on line 30 switch on the transistor 26. Thus the load can be powered at full battery voltage. A fuse 31 is provided to protect against excessive current drain. Where as* preferred the battery is a Lithium Ion battery it will be provided with its own internal battery protection circuit.

Figure 5:
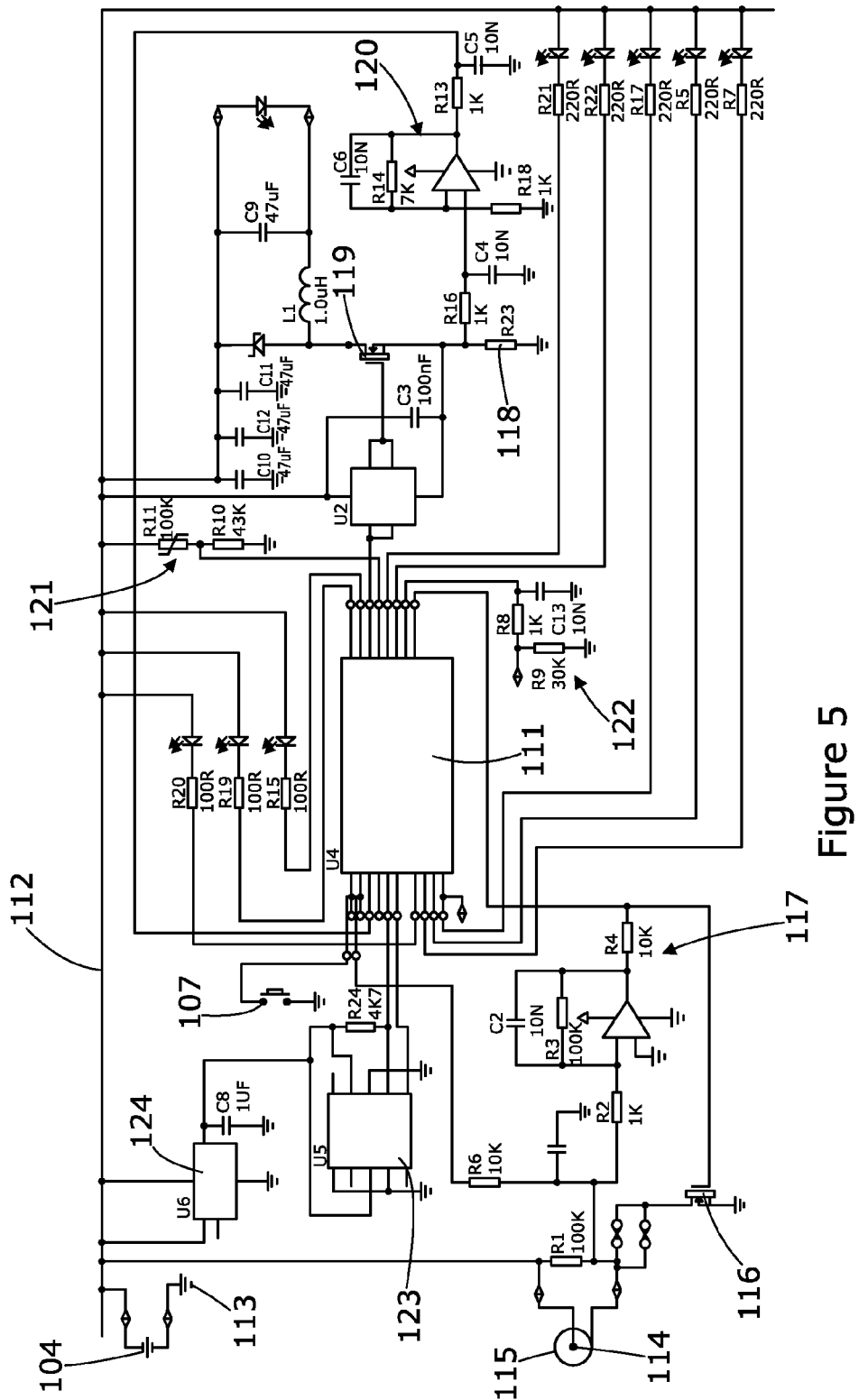
FIG. 5 is a circuit diagram of the lamp of FIG. 3.

By way of example, the lamp can have the following switch actuation protocol:
1. Double click to switch ON at full brightness—switch LED green;
2. Single subsequent click to medium brightness—switch LED orange;
3. Single subsequent click to low brightness—switch LED red;
4. Single subsequent click to full brightness—switch LED green;
5. Long subsequent click to flash—switch LED green;
6. Held subsequent click to switch off Referring to FIGS. 3, 4 and 5, a lamp 100 of the present invention is similar to that of Our Earlier Application in having a printed circuit board (PCB) 102 and a battery 104 mounted in the body. An LED 105, mounted on an emitter plate 101, and a reflector 106 are again housed on the body at an opposite end to a charging port 103 and a press button switch 107. Adjacent to the port 103 and switch 107 an array of three illumination status blue LEDS 108 and an array of five battery-status red LEDs 109 are provided.

The components 103-109 are connected to a power management circuit 110 which is mounted on the PCB 102. The power management circuit is similar to the prior circuit 11 although it has a different integrated circuit (IC) 111 to that of IC 12, of the PIC18F14K22-I/ML type.

The positive terminal of the battery 104 is connected to positive voltage line 112 and the negative terminal to local earth 113. The central contact 114 of port 103 is connected to the positive voltage line 112 and the outer contact 115 is not connected directly to earth. A field effect transistor switch 116 is also provided to allow the battery to be charged and is associated with a detection circuit 117 similar to that of the detection circuit 27.

The prior battery voltage measuring circuit 17 is omitted as the IC includes its own internal battery voltage measuring circuit. The actual current is again measured in terms of voltage across resistor 118 in series with the transistor 119, the voltage being measured by an amplifier circuit 120 and fed back to the IC 111 for control of pulse width.

Two temperature measuring circuits 121, 122 are also provided. Circuit 121 is for measuring the temperature of the circuit board and is similar to that of prior circuit 17. Circuit 122, the sensor for which is not shown, is for measuring the temperature of the emitter plate 101. Signals from the circuits 121, 122 are fed into the IC 111.

In accordance with the present invention a capacitive Micro-Electro-Mechanical Systems (MEMS) accelerometer 123 is provided on the PCB 102. The accelerometer 123 is of the type having a seismic mass, such that it can detect acceleration of the printed circuit on which it is mounted, i.e. acceleration of the lamp as well as the orientation of the lamp by virtue of the action of the gravity on the seismic mass. A voltage regulator 124 between the accelerometer 123 and the positive voltage line 112 limits the maximum voltage which can be applied to the accelerometer. Measurement signals from the accelerometer 123 are also fed into the IC 111.

For setting the circuit up so that the normal orientation and operating temperature of the lamp are recognised, it is switched on after fixing to handle bars and cycled via the button 107 through the high medium and low brightnesses and back to high. Thereafter the brightness of the lamp is also controlled by the IC 111 in response to a combination of gradient measurements from the accelerometer 123 and temperature measurements from the temperature measurements circuits 121, 122.

In order to provide the rider with the necessary brightness from the lamp and to conserve the battery life of the lamp, the brightness is altered in accordance with the requirements of the rider. On travelling at high speed or downhill, the rider requires a bright light to illuminate far ahead on his path and on travelling at low speed or uphill, the rider requires a less bright light. Thus on travelling at high speed or downhill the brightness of the lamp is increased and on travelling at low speed or uphill, the brightness of the lamp is reduced.

To detect a the rate of climb of the bicycle, and thus the orientation of the lamp, a long term measurement of the inclination is taken by the IC 111 from the accelerometer 123 over a prolonged period of time, approximately one hour. This long term measurement determines the normal orientation of the accelerometer. A current measurement of the inclination of the accelerometer is also taken over a period of approximately two seconds. The current measurement is filtered within the IC 111 to reduce the noise of the signal and compared to the long term measurement. On detection of a change to the inclination of the lamp from the normal orientation, the IC 111 alters the brightness of the LEDs in proportion to the difference between the long term measurement and the current measurement. On detection of a downhill gradient the brightness of the lamp is increased and on detection of an uphill gradient the brightness of the LEDs is decreased.

To detect a change in the speed of the rider, the temperature of the emitter plate 101 is measured. As the speed of the rider is increased, the temperature of the emitter plate will decrease due to an increase in the airflow passing over the lamp. Similarly, as the speed of the rider is decreased, the temperature of the emitter plate will increase.

A long term measurement of the temperature of the emitter plate is taken by the IC 111 from the temperature measuring circuit 122 over a prolonged period of time, approximately one hour. This long term measurement determines the normal operating temperature of the emitter plate. A current measurement of the emitter plate temperature is also taken over a period of approximately two seconds. The current measurement is filtered within the IC 111 and compared to the long term temperature measurement to determine changes in the temperature of the emitter plate.

The IC 111 is programmed to maintain the emitter plate at a constant temperature, i.e. the normal operating temperature. Thus on detection of a decrease in the temperature of the emitter plate, i.e. a faster speed, the IC 111 is programmed to increase the brightness of the LED 105 in proportion with the difference between the long term and the current measurement. Similarly on detection of an increase in temperature, i.e. slower speed, the IC 111 is programmed to decrease the brightness.

When the lamp is switched off by the switch 107, the last measured long term values of the temperature and gradient are stored in the memory of the IC 111 and used as the starting values to determine the brightness of the lamp the next time the lamp is switched on.

The invention is not intended to be restricted to the details of the above described embodiment. For instance, in place of determining the rate of climb of the bicycle from the effect of gravity on the accelerometer mounted in the lamp (itself fixed to the bicycle), the lamp can be provided with a GPS receiver programmed to determine the rate of climb. Alternatively the GPS receiver can be provided remotely from the lamp and connected thereto either by wire or wirelessly. The lamp itself does not have to determine the rate of climb of the bicycle since it can be provided with an indication of the gradient at its current location from the GPS receiver from which the lamp can determine the required brightness. Alternatively, the lamp may itself determine the rate of climb of the bicycle using comparative measurements of elevation from the GPS receiver taken over a period of time.

The invention claimed is:

1. A bicycle lamp comprising:
    a housing;
    an LED or array thereof mounted on the housing;
    a battery mounted within the housing;
    a switch for switching on/off the light emitting device;
    means for determining the rate of climb of the bicycle;
    illumination control means for incrementally reducing current to the LED or array in the event of the sensor detecting inclination of the lamp from its normal orientation as the bicycle is being ridden uphill, the normal orientation being when the bike is not being ridden uphill.

2. A bicycle lamp as claimed in claim 1, wherein the means for determining the rate of climb of the bicycle comprises an accelerometer.

3. A bicycle lamp as claimed in claim 1, wherein the means for determining the rate of climb of the bicycle comprises a GPS receiver.

4. A bicycle lamp as claimed in claim 3, wherein the means for determining the rate of climb of the bicycle further comprises a microprocessor programmed to determine the rate of climb from a signal from a GPS receiver.

5. A bicycle lamp as claimed in claim 4, wherein the microprocessor is adapted to calculate its position using signals from the GPS receiver, by timing signals from satellites in orbit of the Earth, and/or to calculate its current elevation or, using mapping software, the current gradient at its location, from signals from the GPS receiver.

6. A bicycle lamp as claimed in claim 3, wherein the GPS receiver is mounted on the housing of the lamp.

7. A bicycle lamp as claimed in claim 3, wherein the lamp is provided with a connector for receiving a signal from an external GPS receiver.

8. A bicycle lamp as claimed in claim 1, wherein the illumination control means is further adapted to incrementally increase the current to the LED in the event of the sensor detecting that the bicycle is being ridden downhill.

9. A bicycle lamp as claimed in claim 1, wherein the lamp further comprises a sensor for sensing the temperature of the housing.

10. A bicycle lamp as claimed in claim 9, wherein the illumination control means is further adapted to incrementally increase the current to the LED in the event of the temperature sensor detecting a decrease in the temperature and/or to incrementally decrease the current to the LED in the event of the temperature sensor detecting an increase in the temperature.

11. A bicycle lamp as claimed in claim 1, wherein the lamp further comprises a status display LED or an array thereof.

12. A bicycle lamp as claimed in claim 11, wherein the status display includes a first array of LEDs to indicate battery status and a second array of LEDs to indicate illumination brightness.

13. A bicycle lamp as claimed in claim 1, including a means for determining the normal, long term orientation of the lamp.

* * * * *